United States Patent
Duraisamy

(10) Patent No.: US 8,889,778 B2
(45) Date of Patent: Nov. 18, 2014

(54) LOW VOLATILE ORGANIC COMPONENT MEDIUM

(75) Inventor: Thirumalai Duraisamy, Pittsburgh, PA (US)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 14/118,557

(22) PCT Filed: May 31, 2012

(86) PCT No.: PCT/US2012/040055
§ 371 (c)(1),
(2), (4) Date: Jan. 6, 2014

(87) PCT Pub. No.: WO2012/166828
PCT Pub. Date: Dec. 6, 2012

(65) Prior Publication Data
US 2014/0107260 A1    Apr. 17, 2014

Related U.S. Application Data

(60) Provisional application No. 61/491,379, filed on May 31, 2011.

(51) Int. Cl.
| | |
|---|---|
| C08K 3/40 | (2006.01) |
| C04B 41/00 | (2006.01) |
| C09D 7/12 | (2006.01) |
| C03C 8/16 | (2006.01) |
| C04B 41/86 | (2006.01) |
| C09D 7/00 | (2006.01) |
| C03C 27/06 | (2006.01) |
| C04B 41/50 | (2006.01) |
| C03C 17/04 | (2006.01) |

(52) U.S. Cl.
CPC ............ C09D 7/1233 (2013.01); C04B 41/009 (2013.01); C03C 8/16 (2013.01); C04B 41/86 (2013.01); C09D 7/001 (2013.01); C03C 27/06 (2013.01); *C03C 2217/72* (2013.01); C04B 41/5022 (2013.01); C03C 17/04 (2013.01)

USPC ............................ 524/497; 524/321; 524/366

(58) Field of Classification Search
USPC .................................. 524/321, 366, 494, 497
See application file for complete search history.

(56) References Cited

U.S. PATENT DOCUMENTS

| 5,354,454 | A | * | 10/1994 | Savastano et al. ............. 208/309 |
| 5,455,368 | A | * | 10/1995 | Janisch et al. ................. 558/277 |
| 6,369,009 | B1 | * | 4/2002 | Machac et al. ................. 510/201 |
| 6,576,300 | B1 | | 6/2003 | Berry, III et al. |
| 7,728,047 | B2 | * | 6/2010 | Notari et al. ..................... 521/44 |
| 2001/0019796 | A1 | * | 9/2001 | Kang et al. ....................... 429/94 |
| 2010/0071837 | A1 | | 3/2010 | Kapp et al. |

FOREIGN PATENT DOCUMENTS

| RU | 2157395 C2 | 10/2000 |
| SU | 1740339 | 6/1992 |

OTHER PUBLICATIONS

International Search Report for corresponding PCT/US2012/040055 mailed Aug. 16, 2012, four pages.
Written Opinion for corresponding PCT/US2012/040055 mailed Aug. 16, 2012, five pages.
Espacenet translation for RU 2157395 corresponding to WO 97/08255, 20 pages.
Brief Statement of Relevance for IDS Reference, SU 1740339 published Jun. 15, 1992, two pages.

* cited by examiner

*Primary Examiner* — Peter Szekely
(74) *Attorney, Agent, or Firm* — Rankin, Hill & Clark LLP

(57) ABSTRACT

A low VOC medium is described. The medium comprises a low VOC solvent such as propylene carbonate, dimethyl carbonate, or combinations thereof. The low VOC medium also comprises one or more glycol ethers. In addition, the low VOC medium also includes one or more surfactants and/or dispersants. The low VOC medium may also optionally comprise one or more binders. The low VOC medium can be used in preparing coating compositions and pastes that are intended for use in applications that include a firing step.

5 Claims, No Drawings

LOW VOLATILE ORGANIC COMPONENT MEDIUM

This application claims priority to provisional application Ser. No. 61/491,379 filed in the U.S. Patent Office on May 31, 2011, and such application is incorporated herein by reference.

FIELD OF THE INVENTION

The present invention relates to a liquid medium or vehicle for coating compositions such as ceramic coating compositions, thick and thin film compositions, glazes and glass enamels. The medium is low in volatile organic compounds (VOC).

BACKGROUND OF THE INVENTION

Ceramic coating compositions for providing decorative and functional coatings for glass, chinaware and the like are well known. In general, ceramic coating compositions are composed of a vehicle or medium, glass frit, and, optionally, pigment. Typically, the composition is in the form of a paste and applied to a substrate such as automotive or architectural glass by silk screening or other application technique. The coated substrate is then heated to volatilize the vehicle or medium, and/or fired to fuse the glass frit, thereby firmly bonding the coating to the surface of the substrate. The vehicle used in these paste compositions typically includes volatile organic solvents. As will be appreciated, such solvents are detrimental to the environment and have resulted in governmental regulations that require lowering the amounts of volatile organic compounds (VOC) in coating compositions. Therefore, a need exists in the art for ceramic coating compositions which have a reduced VOC content.

In an attempt to reduce VOC emissions, prior efforts have been made to formulate paste ceramic coating compositions based on high boiling solvents or curable acrylic monomers. However, because of certain practical issues, such solvents or mediums cannot be used as a primary vehicle or as an additive because they drastically change the drying time and application viscosity of the resulting composition. Accordingly, a need remains for a low VOC medium which still provides acceptable drying and application characteristics for a paste ceramic coating composition using the medium. This need is also applicable to other compositions that are used in firing processes such as glass enamels, glazes and electronic thick and thin films.

SUMMARY OF THE INVENTION

The difficulties and drawbacks associated with previously known systems are addressed in the present composition, coatings, and related methods.

In one aspect, the present invention provides a low VOC medium comprising an effective amount of at least one low VOC solvent selected from the group consisting of propylene carbonate, dimethyl carbonate, and combinations thereof; and at least one glycol ether.

In another aspect, the present invention provides a coating composition comprising, prior to firing, (i) glass frit, and (ii) from about 10% to about 50% of a medium including at least one low VOC solvent selected from the group consisting of propylene carbonate, dimethyl carbonate, and combinations thereof and at least one glycol ether. The coating composition may comprise a ceramic coating composition, a thick film or a glass enamel.

In still another aspect, the invention provides a method of forming a ceramic coating composition. The method comprises providing glass frit, and providing a low VOC medium including an effective amount of at least one low VOC solvent selected from the group consisting of propylene carbonate, dimethyl carbonate, and at least one glycol ether. The method also comprises mixing the glass frit with the low VOC medium to thereby produce the coating composition. The coating composition may comprise a ceramic coating composition, a thick or thin film, a glaze or a glass enamel.

In still another aspect, the invention provides a method of forming a coating on a substrate. The method comprises providing a coating composition including glass frit and a low VOC medium including at least one low VOC solvent selected from the group consisting of propylene carbonate, dimethyl carbonate, and at least one glycol ether. The method also comprises applying the coating composition onto a substrate to thereby form a layer of the coating composition. And, the method comprises drying the layer of the coating composition and subsequently firing the composition. The coating composition may comprise a ceramic coating composition, a thick or thin film, a glaze or a glass enamel.

As will be realized, the invention is capable of other and different embodiments and its several details are capable of modifications in various respects, all without departing from the invention. Accordingly, the description is to be regarded as illustrative and not restrictive.

DETAILED DESCRIPTION OF THE EMBODIMENTS

The present invention provides a low VOC medium for use in forming coating compositions and particularly such compositions in paste form. Preferably, a low VOC solvent, such as for example propylene carbonate (PC), is used as a major VOC controlling ingredient in the medium. Propylene carbonate is a polar but aprotic solvent, which can also be found in certain adhesives, paint strippers, cosmetics, and also used as a plasticizer. Propylene carbonate has been approved and given exempt VOC status by the US Environmental Protection Agency (EPA). Specifically, a listing of compounds excluded from VOC status is set forth under 40 CFR Part 51.100(s). The invention also provides compositions including the low VOC medium, such as ceramic coating compositions, glazes, thick and thin film compositions (which are useful in forming thick or thick film conductors) and glass enamel compositions, all of which include the low VOC medium. In addition, the invention provides methods involving the use of the low VOC medium and the coating compositions.

Medium

In general, the medium comprises an effective amount of one or more low VOC solvents. Preferably, the one or more low VOC solvent(s) is used in the medium in an amount of from about 50% to 90% by weight. Preferably, the low VOC solvent is selected from the group consisting of propylene carbonate (PC), dimethyl carbonate (DMC), and combinations thereof. Although these are the preferred low VOC solvents for use in the preferred embodiment mediums, it is contemplated that other low VOC solvents could be used. The term "low VOC solvent" refers to a compound of carbon which exhibits negligible photochemical reactivity such as for example, the compounds set forth in 40 CFR Part 51.100(s)(1).

The medium also comprises one or more glycol ethers. A wide array of glycol ethers can be used. For example, glycol ethers which have been previously employed in the field of ceramic coating compositions could be used. Non-limiting examples of suitable glycol ethers include dibutyl (DB) carbitol (also known as diethylene glycol dibutyl ether); DOWANOL™ glycol ethers available from Dow Chemical such as EPh glycol ether or TPM; EB glycol ether (also known as 2-butoxyethanol); Texanol® (also known as 2,2,4-trimethyl-1,3-pentanediol-1-isobutyrate); Texanol® ester alcohol (also known as 2,2,4-trimethyl-1,3-pentanediolmono(2-methylpropanoate); glycol ether esters; propylene glycol; dipropylene glycol; and combinations thereof. A preferred glycol ether ester is DB acetate, also known as diethylene glycol monobutyl ether acetate. Another glycol ether which can be used in the preferred embodiment mediums is tetraglyme (also known as tetraethylene glycol dimethyl ether). In no way is the present invention limited to any of these glycol ethers. Instead, it will be appreciated that other glycol ethers which are compatible with the one or more low VOC solvent(s) can be used in the medium.

The medium may in certain embodiments additionally include from about 1% to about 10% by weight of surfactants, dispersing agents, other additives, or combinations thereof. Such agents are known in the art and nonlimiting examples include Aerosol OT (also known as dioctyl sodium sulfosuccinate), Disperbyk® 110, Disperbyk 111, Nuosperse® 700, etc. Disperbyk 110 and 111 are wetting and dispersing formulations as set forth below in Tables 1 and 2. These formulations are available from BYK USA, Inc. of Wallingford, Conn.

TABLE 1

Disperbyk 110

| Component | CAS-No. | Weight Percent |
|---|---|---|
| Phosphoric acid polyester |  | 30.00-60.00 |
| 1-Methoxy-2-propanol acetate | 108-65-6 | 10.00-30.00 |
| Solvent naphtha, petroleum, light aromatic | 64742-95-6 | 10.00-30.00 |
| Phosphoric acid (residual) | 7664-38-2 | 1.00-5.00 |
| 2-Methoxy-1-propanol acetate (impurity) | 70657-70-4 | 0.10-1.00 |

TABLE 2

Disperbyk 111

| Component | CAS-No. | Weight Percent |
|---|---|---|
| Phosphoric acid polyester |  | 60.00-100.00 |
| Phosphoric acid (residual) | 7664-38-2 | 1.00-5.00 |

Nuosperse 700 is a dispersant and available from Elementis Specialties of the Netherlands. Nuosperse 700 is set forth in Table 3.

TABLE 3

Nuosperse 700

| CAS-No. | Component | Weight Percent |
|---|---|---|
| CAS: 251298-11-0 | Oleylalcohol ethoxylated, phosphated, sodium salt, Polymer | 25-50% |
| CAS: 64742-48-9 | Naphtha {petroleum}, hydrotreated heavy EINECS: 256-150-3 | 10-25% |
| CAS: 577-11-7 | di-2-ethylhexyl sulphosuccinate, sodium salt EINECS: 209-406-4 | 10-25% |
| CAS: 34590-94-8 | Dipropylene glycol monomethyl ether EINECS: 252-104-2 | 2.5-10% |
| CAS: 64-17-5 | Ethanol EINECS: 200-578-6 | <2.5% |
| CAS: 64742-82-1 | Low aromatic white spirit EINECS: 265-185-4 | <2.5% |

It will be appreciated that in no way is the present invention limited to the use of any particular surfactant, dispersant, or other additive. Instead, it is contemplated that a wide range of such agents can be used in the low VOC mediums of the present invention. For example, other additives can include odor masking agents, stabilizers, and viscosity adjusting agents.

The medium optionally includes a binder in an amount up to about 10% by weight. Such binders are known in the art and non-limiting examples include modified acrylates, cellulose ethers, polyvinyl pyrrolidones, and combinations thereof. An example of a preferred binder is hydroxypropyl cellulose commercially available under the designation KLUCEL® E, from Ashland Chemicals, Ashland, Ohio. Another example of a preferred acrylate is a low molecular weight ethyl methacrylate copolymer such as ELVACITE® 2043 available from Lucite International. An example of a preferred polyvinyl pyrrolidone is PVP K-15 available from International Specialty Products of Wayne, N.J. It will be appreciated that the invention is not limited to these particular binders. Instead, a wide array of binders having properties suitable for the particular application can be used.

Preferably, the low VOC mediums provide a paste content that exhibits a VOC content of less than 120 g/L as measured by ASTM Method 24. Most preferably, the paste compositions exhibit a VOC content of less than 118 g/L as measured by ASTM Method 24. It will be appreciated that in order to provide such low VOC content, the pastes made with the mediums of the present invention should contain at least 50% by weight solids (inorganic components that do not volatilize upon firing).

In certain embodiments, the medium consists essentially of (i) low VOC solvent(s), (ii) glycol ether(s), (iii) surfactants, dispersants, or both, and (iv) optional binder. Thus, in these embodiments, the medium does not include any other agents or ingredients that would affect the basic and material characteristics of the medium.

The medium is preferably prepared by combining the noted components and, if necessary, heating to bring all components into solution. For example, propylene carbonate is added to a prepared solution comprising glycol ether, binders, surfactants and/or dispersants, followed by vigorous stirring. A clear glycol ether solution is preferably prepared by heating the surfactants and binders to a temperature of from about 150° F. to about 200° F. until a uniform solution is formed. The solution is then cooled and additional optional components such as dispersant and one or more odor mask agent(s) are added with mixing to obtain a uniform solution.

The preferred embodiment medium is water miscible, has good flow characteristics, favorable green strength characteristics, and excellent drying rate and enables the production of a ceramic coating composition with a workable viscosity range, and preferably provides a paste composition having a VOC of less than 120 g/L (measured by ASTM Method 24). In a workable paste composition, the medium constitutes from about 10% to about 50% by weight of the total composition, and more preferably from about 15% to about 45% by weight of the total composition.

Ceramic Coating Composition

After forming a preferred embodiment medium as described herein, the medium can be combined with one or more other components to form a ceramic paste or a glaze. A preferred ceramic coating composition comprises, prior to firing, glass frit, optional pigment(s) or coloring agent(s), and from about 10% to about 50% of the preferred medium. The preferred coating composition may also comprise one or more other agents known in the art such as flow controlling agents, optical enhancing agents and the like. An optional preferred additive is Indopol L-14, available from INEOS Oligomers of League City, Tex. Indopol L-14 is a polybutene oligomer as described below in Table 4. Indopol L-14 is added to the ceramic paste composition or used during mill base. Indopol L-14 enhances the printing properties of the resulting pastes.

pigments such as, for example, clay, silica, talc, mica, wollastonite, wood flower and the like can also be included in the coating composition.

Ceramic pastes comprising the medium, can be applied to a substrate or other surface using a variety of techniques. Non-limiting examples of such techniques include screen printing and roll coating. It is also contemplated that the preferred embodiment ceramic coating compositions can be applied by spraying, brushing, and electrostatically.

When applying a ceramic paste comprising a preferred embodiment medium by screen printing, the viscosity of the paste is preferably from about 8,000 cPS to about 40,000 cPS at 10 RPM at 25° C. After application, the thickness of the resulting layer (before drying) is typically from about 1 to about 150 microns.

When applying a ceramic paste comprising a preferred embodiment medium by roll coating, the viscosity of the paste is preferably from about 8,000 cPS to about 30,000 cPS at 10 RPM at 25° C. The thickness of the wet film is typically from about 5 microns to about 100 microns.

When applying a ceramic paste comprising a preferred embodiment medium by screen printing, the viscosity of the paste is preferably from about 8000 cPS to about 25,000 cPS at 10 RPM at 25° C.

TABLE 4

Indopol L-14

| Typical Properties | Method/ASTM Number (if applicable) | | Value |
|---|---|---|---|
| Molecular Weight, $M_n$ | Gel Permeation Chromatography | modified D 3536 | 370 |
| Polydispersity Index, $M_w/M_n$ | Gel Permeation Chromatography | modified D 3536 | 1.30 |
| Flash Point (° C.) | Cleveland Open Cup | D 92 | >138 |
|  | Luchaire Closed Cup | NFT 60103 | — |
| Turbidity (NTU) | Nephelometric | D 5180 | <4 |
| Acid Number (mg KOH/g) | Titrimetric | D 974 | <0.05 |
| Bromine Number (g $Br_2$/100 g) | Titrimetric | IP 129/87 | 52 |
| Bromine Index (mg $Br_2$/100 g) | Titrimetric | D 2710 | — |
| Chlorine (ppm) | X-Ray Fluorescence | n/a | 60 |
| Metals (ppm): | Inductively Coupled Plasma | n/a |  |
| Na | Spec. |  | <1 |
| K |  |  | <1 |
| Fe |  |  | <1 |
| Specific Gravity (at 15.5° C.) |  | D 1298 | 0.839 |
| Glass Transition Temperature, $T_g$ (° C.) | Differential Scanning Calorimetry | n/a | −90.5 |
| Pour Point (° C.) |  | D 97 | −51 |
| Viscosity Index |  | D 2270 | 60 |
| Viscosity (SUS) | Saybolt | D 2161 | 136.5 |
| Temp (° C.) |  |  | 40 |
| Refractive Index |  | D 1218 | 1.470 |
| Total Sulfur (ppm) | X-Ray Analysis | n/a | <5 |

Regarding the glass frit, nearly any type of glass frit known in the art can be utilized in the preferred embodiment ceramic coating compositions. A wide array of glass frit is commercially available from numerous suppliers. The present invention is not limited to any particular type or grade of glass frit.

Concerning the optional pigments or coloring agents, the pigments may be organic or inorganic and functionally contribute to opacity and color in addition to durability and hardness of the resulting coating. However, some coating compositions in accordance with the present invention may contain little or no opacifying pigments and may thus be described as clear coatings. Pigments ordinarily can include opacifying pigments such as, for example, titanium dioxide, zinc oxide, leaded zinc oxide, as well as tinting pigments such as carbon black, yellow oxides, brown oxides, tan oxides, raw and burnt sienna or umber, chromium oxide green, phthalocyanine blue and green, phthalonitrile blue, ultramarine blue, cadmium pigments, chromium pigments, and the like. Filler Coatings, films, or layers of ceramic pastes comprising a preferred embodiment medium can be dried in a variety of different fashions. Preferably, drying is performed by heating to a temperature of from about 250° F. to about 300° F. (glass temperature) for a time period of from about 2 minutes to about 4 minutes for layers formed by screen printing and from about 2 minutes to about 6 minutes for layers formed by roll coating.

Dried or partially dried layers of such ceramic pastes can be subjected to a firing operation by further heating. For example, heating in an atmosphere of from about 1,100° F. to about 1,300° F. for a time period of from about 3 minutes to about 6 minutes is typical.

Thick Films

The thick film circuit is one well-known form of monolithic integrated microelectronic circuit. Circuits of this type are particularly useful where a large number of passive components are required, or where moderately high power dissipation is required. Thick film circuits are less costly to produce and can yield a broader range of resistance values than thin film circuits.

An embodiment of the invention is a thick film composition including the low VOC medium disclosed herein. The thick film of the invention may include a conductive metal such as gold, silver, platinum, aluminum, nickel and other metals (and mixtures thereof) at least one glass component and at least one metal component. The glass component may also comprise a mixture of glasses such as a first glass and a second glass. The first glass composition may comprise, for example, about 25 to about 67 mole % BaO, about 33 to about 70 mole % $SiO_2+B_2O_3$, about 0.1 to about 20 mole % $TiO_2$. The second glass composition comprises about 27 to about 65 mole % ZnO, and about 33 to about 70 mole % $SiO_2+B_2O_3$. The first and second glasses may be present in the glass component in a weight ratio of about 1:40 to about 20:1. When in a green, unfired state, the inventive paste composition has a viscosity of from about 200 to about 500 kilocentipoise (kcps) at 10 rpm when measured at 25° C. using Brookfield HBT type SC4 14/5R viscometer and spindle 14 assembly. The lead- and cadmium-free thick film pastes of the present invention possess desirable properties, including proper rheology, good shelf life, moderate linear coefficient of expansion, good adhesion to the substrates, good chemical resistance and mechanical durability, excellent solder leach resistance, excellent solder wetting, and low resistivity, all achieved by a lead free and cadmium free paste that can be fired at relatively low temperatures with a wide processing window. Further details on thick film pastes may be found in commonly owned U.S. Pat. No. 7,176,152, which is incorporated by reference in its entirety. It will be appreciated that any one of a variety of glasses and conductive metals or filler may be used in connection with the medium of the present invention so as to provide a thick film composition. In addition to thick films, it will be appreciate that the medium of the present invention may be used in electronic thin film compositions. Thick and thin film compositions made using the medium of the present application may be used to form conductive (or resistive) traces or conductive paths on anyone of a variety of substrates including but not limited to silicon (both for solar and standard semiconductor applications), aluminum nitride, beryllium oxide, porcelain enamel and glass.

Glass Enamels

Crystallizing glass enamel compositions are well known in the art. They can be used for a variety of applications such as, for example, decorative coatings for glassware, chinaware, and the like. They are especially useful in forming colored borders around glass sheets used for automotive windshields, sidelights and backlights. The colored borders enhance appearance as well as prevent UV degradation of underlying adhesives. The crystallizing glass enamels are reactive compositions for they contain components that react and crystallize upon firing.

In general, these enamel compositions consist mainly of a glass frit, a colorant and an organic vehicle such as the low VOC medium of the invention. They are applied to a substrate, for example, a sheet of glass, and subsequently fired to burn off the organic vehicle and fuse the frit thus bonding the enamel coating to the substrate. Glass sheets for automotive use are generally coated with the enamel composition and then subjected to a forming process at elevated temperatures. During this treatment the enamel melts and fuses to the glass substrate and the glass is formed into a desired final shape. Such compositions may also be applied to one layer of a multilayer laminate (such as a safety glass windshield) prior to stacking the layers together, whereby the pigment/color is in the interior of the resulting multilayer laminate.

An embodiment of the invention is a method of forming a decorated glass structure comprising: a. applying to a first glass substrate a green crystallizing enamel composition comprising, prior to firing: i. a reactive glass component, ii. a pigment, iii. an organic vehicle comprising a low VOC medium including an effective amount of at least one low VOC solvent selected from the group consisting of propylene carbonate, dimethyl carbonate, and combinations thereof; and at least one glycol ether; b. stacking a second glass substrate with the first glass substrate wherein the green crystallizing enamel composition lies between the first and second glass substrates, and c. subjecting the stacked glass substrates to a firing operation.

Further teachings on glass enamels can be found in commonly owned U.S. Pat. Nos. 5,153,150; 5,306,674; 5,334,412; 5,725,919; 6,105,394; 6,624,104; 7,832,233; 7,833,439; 8,007,930; and 8,092,911, all of which are incorporated by reference in their entireties.

EXAMPLES

A series of evaluations were conducted to investigate several preferred embodiment mediums and their characteristics.

Example 1

A preferred embodiment medium was prepared as set forth below in Table 5:

TABLE 5

| Preferred Embodiment Low VOC Medium | |
|---|---|
| Ingredients | Wt % |
| Propylene carbonate | 72 |
| DB acetate | 3 |
| Dipropylene glycol | 2 |
| Propylene glycol | 4 |
| EB glycol ether | 7 |
| Texanol ester alcohol | 1 |
| EPh glycol ether | 1 |
| Klucel E | 4.5 |
| Elvacite 2043 | 2 |
| Aerosol OT | 2 |
| BYK 110 | 1.5 |

Several ceramic pastes were prepared using the preferred embodiment medium of Table 5. Various characteristics of the pastes were compared to corresponding ceramic pastes prepared using a control medium, designated as "1597." The 1597 control medium is a water miscible, glycol ether based medium. 1597 has a very high VOC which does not meet current EPA regulations for some states.

The results of the comparison of ceramic pastes are set forth below in Table 6.

TABLE 6

Results of Comparison Between Ceramic Pastes

| Sample | Water Miscibility vs. 1597 | Flow vs. 1597 | Green strength vs. 1597 | Color vs. 1597 | VOC g/L | Viscosity cPS at 10 rpm |
|---|---|---|---|---|---|---|
| 1 Bi cool grey | Good | Better | 80-100% | Slightly darker, burning, dE = 0.2 | 116 | 14100 |
| 2 Bi white etch | Very good | Better | 80-100% | Whiter, dE = 0.5 | 116 | 14300 |
| 3 Bi Warm Grey | Good | Better | 80-100% | Slightly darker, dE = 0.15 | 117 | 11800 |
| 4 Zn white | Good | Better | 100% | Whiter dE = 0.5 | 110 | 11200 |
| 5 Zn white etch | Very good | Better | 80-100% | Whiter dE = 0.5 | 110 | 10900 |

In all cases, ceramic pastes comprising the preferred embodiment medium of Table 5 exhibited a drying time 30 seconds faster than pastes comprising the 1597 control medium. Faster drying times occurred for layers of ceramic paste using the preferred medium, formed by both screen printing and by roll coating.

Example 2

Another preferred embodiment medium in accordance with the present invention is set forth below in Table 7.

TABLE 7

Preferred Embodiment Low VOC Medium

| Ingredients | Wt % |
|---|---|
| Dimethyl carbonate | 12.7 |
| Propylene carbonate | 61.6 |
| Tetraglyme | 5.14 |
| N-methyl pyrrolidone | 4.3 |
| DB carbitol | 1.71 |
| TPM | 1.71 |
| PVP K-15 | 1.71 |
| Non-ionic Cellulose Ether | 3.43 |
| Aerosol OT | 2.574 |
| Wetting and Dispersing Agent | 2.574 |
| ISA | 1.71 |
| Propylene glycol | 0.855 |

The total VOC of the preferred embodiment medium set forth in Table 7 is 112.5 g/L. The preferred embodiment medium of Table 7 exhibited attractive workability properties. In Table 7, ISA is isostearic acid.

The low VOC mediums and ceramic compositions comprising such, find wide application. For example, the low VOC mediums and/or ceramic compositions as described herein can be used for forming decorative and functional coatings for glass, china, and other substrates. Such decorative coatings include those that form "glass" or "glass-ceramic" coatings in addition to ceramic coatings described above. Such coatings are commonly referred to as glass enamels, glass colors or glazes. The low VOC mediums and ceramic compositions will also find use in the electronic industry in the formation of conductive thick or thin film pastes. Furthermore, other uses and applications are contemplated in the fields of chemical processing, automotive and appliance manufacturing, and the like.

Many other benefits will no doubt become apparent from future application and development of this technology.

All patents, published applications, government regulations, and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previously known compositions and practices. However, it will be appreciated that various changes in the details, materials and arrangements of components, which have been herein described and illustrated in order to explain the nature of the invention, may be made by those skilled in the art without departing from the principle and scope of the invention, as expressed in the appended claims.

What is claimed is:

1. A coating composition comprising, prior to firing: glass frit;
and from about 10% to about 50% of a medium including dimethyl carbonate, and at least one glycol ether.

2. The coating composition of claim 1, wherein the medium further comprises up to 10% by weight of a binder, and the coating composition has a viscosity of from about 8,000 to about 40,000 cPS at 10 RPM and 25° C.

3. The coating composition of claim 1, wherein said coating composition is selected from the group consisting of a ceramic coating composition, a thin film, a thick film, a glaze and a glass enamel, and said coating composition exhibits a VOC content of less than 120 g/L as measured by ASTM Method 24.

4. A method of forming a coating composition, the method comprising:
providing glass frit;
providing a low VOC medium including an effective amount of dimethyl carbonate; and at least one glycol ether;
mixing the glass fit with the low VOC medium to thereby produce the coating composition,
wherein said coating composition is selected from the group consisting of a ceramic coating composition, a thick film, a thin film, a glaze and a glass enamel, and said composition exhibits a VOC content of less than 120 g/L as measured by ASTM Method 24.

5. A coating composition comprising a glass frit; and from about 10% to about 50% of a medium including dimethyl carbonate and at least one glycol ether, wherein said coating composition is selected from the group consisting of a glass enamel, an electronic thick film, an electronic thin film and a glaze.

* * * * *